(12) United States Patent
Park et al.

(10) Patent No.: US 8,726,302 B2
(45) Date of Patent: May 13, 2014

(54) SPINDLE MOTOR

(75) Inventors: Jaehyun Park, Seoul (KR); Yongjoo Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 13/500,825

(22) PCT Filed: Oct. 6, 2010

(86) PCT No.: PCT/KR2010/006825
§ 371 (c)(1),
(2), (4) Date: Apr. 6, 2012

(87) PCT Pub. No.: WO2011/043586
PCT Pub. Date: Apr. 14, 2011

(65) Prior Publication Data
US 2012/0210338 A1 Aug. 16, 2012

(30) Foreign Application Priority Data
Oct. 8, 2009 (KR) ........................ 10-2009-0095440

(51) Int. Cl.
*G11B 17/028* (2006.01)
(52) U.S. Cl.
USPC ............................ 720/707; 720/704; 720/709
(58) Field of Classification Search
USPC .......... 720/703, 704, 706, 707, 709, 712, 714
See application file for complete search history.

(56) References Cited

U.S. PATENT DOCUMENTS

| 7,802,272 B2 * | 9/2010 | Kanzawa et al. ............. 720/707 |
| 2007/0143773 A1 | 6/2007 | Park et al. |
| 2009/0125931 A1 * | 5/2009 | Smirnov et al. ............... 720/703 |
| 2009/0183191 A1 | 7/2009 | Park |

FOREIGN PATENT DOCUMENTS

| JP | 06-084253 A | | 3/1994 |
| JP | 2006252623 A | * | 9/2006 |
| KR | 10-2009-0022318 A | | 3/2009 |
| KR | 10-2009-0057551 A | | 6/2009 |
| KR | 10-2009-0078072 A | | 7/2009 |

OTHER PUBLICATIONS

International Search Report in International Application No. PCT/KR2010/006825, filed Oct. 6, 2010.

\* cited by examiner

*Primary Examiner* — Will J Klimowicz
(74) *Attorney, Agent, or Firm* — Saliwanchik, Lloyd & Eisenschenk

(57) ABSTRACT

A spindle motor is disclosed, characterized by: a rotation shaft rotated by a stator and a rotor; a turn table rotated by the rotation shaft and accommodated by an optical disk; and a center cone moved along an axial direction of the rotation shaft for being brought into contact with an inner periphery of the optical disk to align a rotation center of the optical disk with a rotation center of the rotation shaft, wherein the center cone contacting the inner periphery of the optical disk is formed with a rise prevention unit configured to reduce a contact area with the inner periphery of the optical disk and to tightly contact the optical disk to the turn table.

19 Claims, 2 Drawing Sheets

SPINDLE MOTOR

CROSS-REFERENCE TO RELATED APPLICATIONS

This application is the U.S. national stage application of International Patent Application No. PCT/KR2010/006825, filed Oct. 6, 2010, which claims priority to Korean Application No. 10-0095440, filed Oct. 8, 2009 the disclosures of each of which are incorporated herein by reference in their entirety.

TECHNICAL FIELD

The present invention relates to a spindle motor configured to rotate an optical disk such as a blu-ray disk at a high speed.

BACKGROUND ART

A spindle motor performs the function of rotating a disk to enable an optical pickup which linearly reciprocates in an optical disk drive (ODD) to read data recorded on the disk.

In general, a compact disk is formed with a gap of 1.7 μm between tracks on which data is recorded, while a Blu-ray disk (BD) is formed with a gap of 0.7 μm between tracks on which data is recorded. The gap between the tracks in the BD is rather narrow than that of the compact disk, whereby the BD can store more data over the compact disk.

Furthermore, in order to read and write on the BD in a short period of time, a rotating speed of BD is faster than the compact disk. A spindle motor configured to rotate the BD includes a turn table coupled to a rotation shaft and disposed with the BD, and a center cone coupled to the rotation shaft. The BD is coupled to the center cone and arrange on the turn table. An inner periphery of the BD coupled to the center cone is brought into contact with an entire outer periphery of the center cone.

In a case the rotation shaft of the spindle motor rotates at a speed exceeding 10,000 rpm while the inner periphery of the BD coupled to the center cone is brought into contact with an entire outer periphery of the center cone, part of the BD surfaces from the turn table due to resonance phenomenon, whereby data read error and write error are generated.

DISCLOSURE OF INVENTION

Technical Problem

The present invention is disclosed to obviate the above-mentioned problems, and to provide a spindle motor configured to fix a center cone and an optical disk without any slip and to prevent data read error and data write error caused by the optical disk rising from a turn table at a high speed.

Technical problems to be solved by the present invention are not restricted to the above-mentioned, and any other technical problems not mentioned so far will be clearly appreciated from the following description by skill in the art.

Solution to Problem

In one general aspect of the present invention, there is provided a spindle motor, characterized by: a rotation shaft rotated by a stator and a rotor; a turn table rotated by the rotation shaft and accommodated by an optical disk; and a center cone moved along an axial direction of the rotation shaft for being brought into contact with an inner periphery of the optical disk to align a rotation center of the optical disk with a rotation center of the rotation shaft, wherein the center cone contacting the inner periphery of the optical disk is formed with a rise prevention unit configured to reduce a contact area with the inner periphery of the optical disk and to tightly contact the optical disk to the turn table.

In another general aspect of the present invention, there is provided a spindle motor, characterized by: a rotation shaft rotated by a stator and a rotor; a turn table integrally rotating with the rotation shaft and accommodated by an optical disk; a body movably coupled to the rotation shaft; and a center cone including a first surface slantingly extended from a margin of a distal end of the body, a second surface slantingly extended along a margin of a distal end of the first surface to be provided with a friction preventing unit, and a slit formed at the turn table, and cut out along the second surface upto a distal end of the second surface to reduce an area contacting the optical disk, whereby an inner periphery of the optical disk is brought into contact to align a center of the optical disk to a same axial line as that of the rotation shaft, wherein a slant angle formed by an imaginary line perpendicular to the rotation shaft is relatively greater than a slant angle formed by an imaginary line perpendicular to the rotation shaft and the first surface, and the slit is formed at an equidistant gap along the second surface.

In still another general aspect of the present invention, a spindle motor is provided, the motor characterized by: a rotation shaft rotated by a stator and a rotor; a turn table integrally rotating with the rotation shaft and accommodated by an optical disk; a body movably coupled to the rotation shaft; and a center cone including a first surface slantingly extended from a margin of a distal end of the body, a second surface slantingly extended along a margin of a distal end of the first surface to be provided with a friction preventing unit, and a slit formed at the turn table, and protruded upto a distal end of the second surface along the second surface to induce the optical disk to be accommodated on the turn table by reducing an area contacting the optical disk, whereby an inner periphery of the optical disk is brought into contact to align a center of the optical disk to a same axial line as that of the rotation shaft, wherein a slant angle formed by an imaginary line perpendicular to the rotation shaft is relatively greater than a slant angle formed by an imaginary line perpendicular to the rotation shaft and the first surface, and the slit is formed at an equidistant gap along the second surface.

Advantageous Effects of Invention

The spindle motor according to the present invention has advantageous effects in that an optical disk is fixed to a center cone without slip to prevent part of the optical disk from rising from the turn table even at more than a designated revolution, whereby data read error and data write error can be greatly reduced.

BEST MODE FOR CARRYING OUT THE INVENTION

Figure 1:
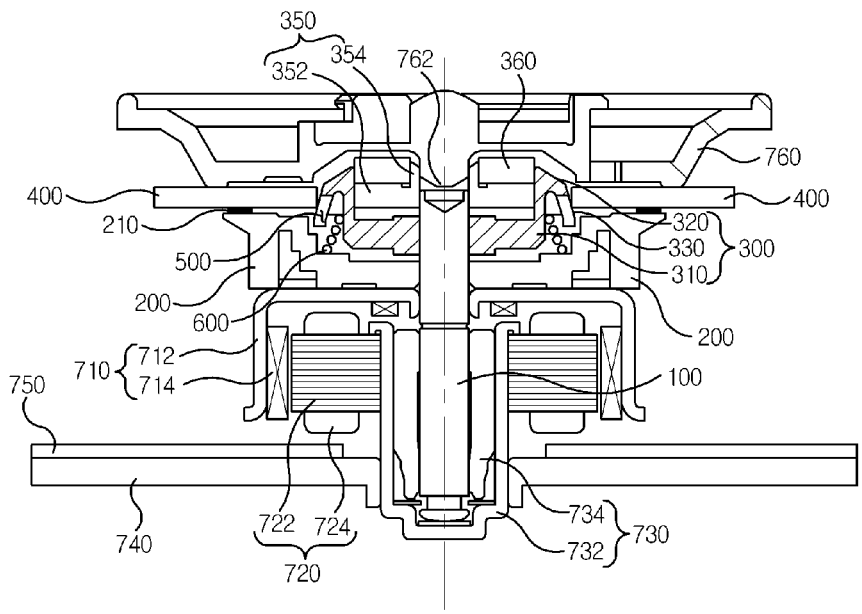
FIG. 1 is a cross-sectional view illustrating an overall structure of a spindle motor according to an exemplary embodiment of the present invention.

A spindle motor according to the exemplary embodiments of the present invention will be described in detail with reference to the accompanying drawings. Hereinafter, exemplary embodiments of the present invention are described in detail with reference to the accompanying drawings. In the drawings, sizes or shapes of constituent elements may be exaggerated for clarity and convenience.

Particular terms may be defined to describe the invention in the best mode as known by the inventors. Accordingly, the meaning of specific terms or words used in the specification and the claims should not be limited to the literal or commonly employed sense, but should be construed in accordance with the spirit and scope of the disclosure. The definitions of these terms therefore may be determined based on the contents throughout the specification.

FIG. 1 is a cross-sectional view illustrating an overall structure of a spindle motor according to an exemplary embodiment of the present invention. Referring to FIG. 1, a spindle motor may include a rotation shaft (100), a turn table (200), a center cone (300) and a rise prevention unit (500).

The rotation shaft (100) is rotatively supported by a bearing assembly (730) including a bearing housing (732) and a bearing (734). The bearing assembly (730) is coupled to a base plate (740) on which a printed circuit board (750) is arranged. The base plate (740) may include a metal plate formed with a buffering unit. The buffering unit of the base plate (740) is coupled to the bearing housing (732), where the bearing (734) is accommodated into the bearing housing (732).

An outer periphery of the bearing housing (732) is fixed by a stator including a core (722) wound by a coil (724). The rotation shaft (100) rotatively coupled to the bearing (734) is fixed by a rotor (710). The rotor (710) may include a yoke (712) and a magnet (714) fixed by the yoke (712) to face the core (722).

The rotation shaft (100) is rotated by the electromagnetic force generated by the coil (724) of the rotor (710) and by the rotation force generated by the electromagnetic force generated by the magnet (714) of the stator (720). The turn table (200) is rotated along with the rotation shaft (100) by the rotation of the rotation shaft (100). The turn table (200) is arranged thereon with an optical disk (400) such as Blu-ray disk.

The turn table (200) may include a felt (210) for preventing the optical disk (400) from slipping caused by the rotation of the turn table (200). The felt may be formed in the shape of a ring on the turn table (200), for example.

The center cone (300) is inserted into the rotation shaft (100) and moves along an axial direction of the rotation shaft (100). The center cone (300) is arranged on an upper surface of the turn table (200) and coupled to an inner periphery of the optical disk (400). The center cone (300) aligns a rotation center of the optical disk (400) onto a rotation center of the rotation shaft (100).

Meanwhile, part of an inner periphery of the optical disk (400) fixed at the center cone (300) and the turn table (200), and rotating along with the turn table (200) may rise from the turn table (200) along the center cone (300) due to resonance phenomenon as the turn table (200) is rotated at a high speed.

That is, as the turn table is rotated at a high speed, the optical disk (400) may be slantedly arranged on an upper surface of the turn table (200), and in a case the optical disk (400) is slantedly arranged on an upper surface of the turn table (200), there may occur date read error and data write error.

The center cone (300) includes a rise prevention unit (500). The rise prevention unit (500) formed at the center cone (300) returns part of the optical disk (400) that has risen from the turn table (200) due to resonance phenomenon to an upper surface of the turn table (200). The rise prevention unit (500) prevents the optical disk (400) from rising from the turn table (200).

A spring (600) is interposed between the turn table (200) and the center cone (300), as shown in FIG. 1, where the spring (600) pushes the center cone (600) toward an axial direction and a radial direction of the rotation shaft (100), whereby a rotation center of the rotation shaft (100) is aligned on a rotation center of the optical disk (400).

FIGS. 2 through 5 are perspective views illustrating a center cone which is an essential part of a spindle motor according to various exemplary embodiments of the present invention.

Referring to FIGS. 2 through 5, the center cone (300) may include a body (310) having a first surface (320) and a second surface (330) facing the first surface (320). The body (310) may take the shape of a cylinder opened at an upper surface thereof, for example. The body (310) may be formed at a center floor thereof with a through hole through which the rotation shaft (100) is inserted, and the body (310) moves along an axial direction of the rotation shaft (100).

The first surface (320) is extended from an upper edge of the body (310) to an external side of the body (310), and slantedly arranged relative to a lateral surface of the body (310). For example, the first surface (320) may form an acute angle relative to the lateral surface of the body (310).

The first surface (320) slantedly formed relative to the lateral surface of the body (310) serves to guide an inner periphery of the optical disk (400) to the second surface (330) connected to the first surface (320). The second surface (330) is extended from a distal end of the first surface (320), where the second surface (330) and the first surface (310) form an obtuse angle. The inner periphery of the optical disk (400) guided from the first surface (310) is inserted into the second surface (330). The rotation center of the optical disk (400) is aligned to the rotation center of the rotation shaft of the optical disk (400) by the second surface (330).

That is, an angle formed by the first surface (320) and the radial direction perpendicular to the axial direction of the rotation shaft (100) is smaller than an angle formed by the second surface (330) and the radial direction.

In order to prevent the rotation center of the optical disk (400) inserted through the first surface (320) of the center cone (300) from being eccentrically deviated from the rotation shaft (100), an angle formed by the second surface (330) and the lateral surface of the body (310) is made to be a smaller than an angle formed by the first surface (320) and the lateral surface of the body (310).

A projection distance (d) between a border between the first surface (320) of the center cone (300) and the second surface (330) and a bottom end of the second surface (330) may be approximately 0.1 mm-0.2 mm. Therefore, a length between the border and the bottom end of the second surface (330) is longer than the projection distance (d).

The rise prevention unit (500) is formed at the second surface (330) of the center cone (300) to reduce a contact area between the second surface (330) and the inner periphery of the optical disk (400), thereby reducing a friction resistance of the second surface (330) and the optical disk (400), whereby the optical disk (400) is prevented from rising from the turn table (200). Furthermore, the rise prevention unit (500) swiftly returns the optical disk (400) risen from the turn table (200) to the upper surface of the turn table (200).

In the present exemplary embodiment, the rise prevention unit (500) may take the shape of a protruder (520) or a slit (510).

In a case the optical disk (400) on the turn table (200) is rotated at a rotating speed of approximately 6,500 rpm, part of the optical disk (400) is raised from a felt (210) by resonance phenomenon. At this time, the optical disk (400) raised from the felt (210) may generate a data write error or a data read error if the optical disk (400) is not returned to the felt (210). The reason of the optical disk (400) failing to return to the felt (210) is due to a large friction force on the inner periphery of the optical disk (400) and the second surface (330) of the center cone (300).

The rise prevention unit (500) according to the present invention can not only prevent the optical disk (400) from rising at a particular rpm, but swiftly return the optical disk (400) raised from the felt (210) to the felt (210). To this end, the rise prevention unit (500) according to the present invention serves to reduce the friction force between the second surface (330) of the center cone (300) and the inner periphery of the optical disk (400).

Therefore, the rise prevention unit (500) reduces the friction area between the center cone (300) and the optical disk (400) when the optical disk (400) is rotated at the same rotating speed as that of resonance revolution per minute to prevent the optical disk (400) from rising along the second surface (330), and to return the optical disk (400) raised from the felt (210) to the upper surface of the turn table (200).

The rise prevention unit (500) serves to allow part of the optical disk (400) raised from the felt (210) to swiftly slip toward the turn table (200) along the second surface (330) of the center cone (300), whereby the optical disk (400) is aligned on the upper surface of the turn table (200).

Mode For The Invention

Figure 2:
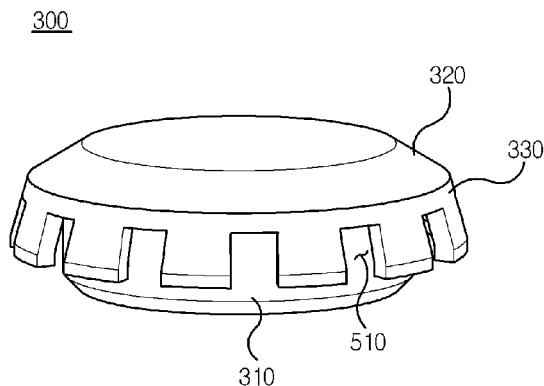
FIGS. 2 through 5 are perspective views illustrating a center cone which is an essential part of a spindle motor according to various exemplary embodiments of the present invention.
Figure 3:
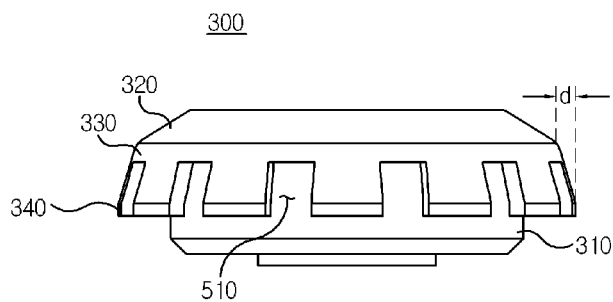

As illustrated in FIGS. 2 and 3, the rise prevention unit (500) may include a plurality of slits (510) intermittently cut out from the bottom end of the second surface (330) to the border between the first surface and the second surface (320, 330). For example, the rise prevention unit (500) may take the shape of a comb having intermittently formed slits (510).

In the exemplary embodiment of the present invention, the rise prevention unit (500) having the slit shape (510) may take various shapes and various areas for reducing the friction area between the inner periphery of the optical disk (400) and the second surface (330) of the center cone (300). For example, the rise prevention unit (500) having the slit (510) shape may be formed at a equidistant gap along the second surface (330) for minimizing the friction resistance.

Figure 4:
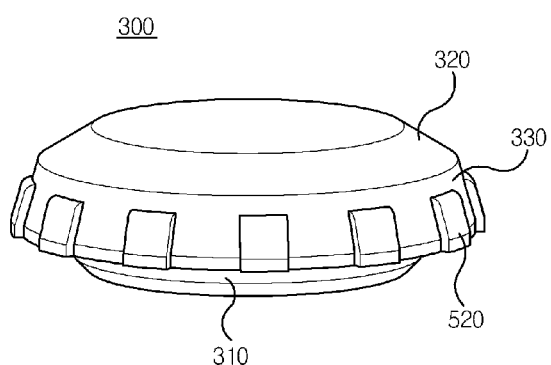
Figure 5:
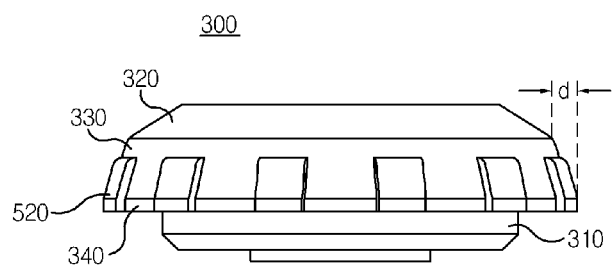

The rise prevention unit (500) having the slit shape may be formed with a chamfer at a margin to allow the optical disk (400) to easily slip along the second surface (330). As depicted in FIG. 4, the rise prevention unit (500) may include protruders (520) that protrude from a border between the first surface (320) and the second surface (330) to the bottom end of the second surface (330).

The rise prevention unit (500) having the protruder (520) shape is formed with a narrow width to allow the optical disk (400) to easily slip along the second surface (330) of the center cone (300), and a plurality of rise prevention units (500) may be formed each at a equidistant gap along the second surface (330) in order to reduce the friction force with the inner periphery of the optical disk (400). The rise prevention unit (500) having the protruder (520) shape may be formed with a rectangular parallelepiped (parallelopipedon) block having a thin thickness, for example.

The rise prevention unit (500) having the protruder shape may be formed at a margin with a chamfer (521) to allow the inner periphery of the optical disk (400) to easily slip along the second surface (330) of the center cone (300). Alternatively, the margin of the rise prevention unit (500) having the protruder shape may be processed with a curvature.

The second surface (330) is formed with a third surface (340) for stably fixing the optical disk (400) arranged on the turn table (200) by the rise prevention unit (500). The third surface (340) is extended from an edge of the second surface (330), and formed in a direction parallel with the axial direction of the rotation shaft (100). Meanwhile, the upper surface of the body (310) of the center cone (300) is formed with a suction magnet (360). Furthermore, the upper surface of the body (310) of the center cone (300) is arranged with a metal clamper (760) that is sucked by the suction magnet (360).

Following the optical disk (400) being accommodated on the turn table (200), the clamper (760) moves downward, and the metal clamper (760) depresses the optical disk (400) by the suction magnet (360). The center cone (300) may further include a back yoke (350) formed on the body (310), and the closely-adhered magnet (360).

The back yoke (350) is mounted at a distal end of the body (310) to move with the body (310) along the axial direction of the rotation shaft (100). The closely-adhered magnet (360) is arranged on the back yoke (350). The closely-adhered magnet (360) is attached to the damper 760) of an optical disk drive (not shown) to prevent the center cone (300) from rising along the axial direction of the rotation shaft (100) in a case the optical disk (400) is rotated. The back yoke (350) may include a plate (352) coupled to the center cone (300) and a bushing (354) provided at the plate (352).

The plate (352) is fixed at the body (310) of the center cone (300) to provide a space in which the closely-adhered magnet (360) is mounted. The bushing (354) is protruded from the plate (352) to be coupled to the rotation shaft (100), and coupled to a guide protruder (762) protruded from the clamper (760). The guide protruder (762) align the rotation center of the center cone (300) and the rotation center of the optical disk (400) on the rotation center of the rotation shaft (100). At this time, an upper surface of the plate (352) is at a position higher than a distal end of the rotation shaft (100), whereby the optical disk (400) can be rotated in a more stable manner.

While the present invention has been particularly shown and described with reference to exemplary embodiments thereof, the general inventive concept is not limited to the above-described embodiments. It will be understood by those of ordinary skill in the art that various changes and variations in form and details may be made therein without departing from the spirit and scope of the present invention as defined by the following claims.

INDUSTRIAL APPLICABILITY

The spindle motor according to the present invention has an industrial applicability in that an optical disk is fixed to a center cone without slip to prevent part of the optical disk from rising from the turn table even at more than a designated revolution, whereby data read error and data write error can be greatly reduced.

The invention claimed is:
1. A spindle motor, comprising:
a rotation shaft rotated by a stator and a rotor;
a turn table rotated by the rotation shaft and accommodated by an optical disk; and
a center cone moved along an axial direction of the rotation shaft for being brought into contact with an inner periphery of the optical disk to align a rotation center of the optical disk with a rotation center of the rotation shaft, wherein the center cone contacting the inner periphery of the optical disk is formed with a rise prevention unit, wherein the center cone includes a body into which the rotation shaft is inserted, a first surface slantingly and continuously extended along a margin of an upper distal end of the body, and a second surface slantingly extended along a margin of a lower distal end of the first surface and formed with the rise prevention unit.

2. The spindle motor of claim 1, wherein a slant angle formed by a radial direction perpendicular to the axial direction of the rotation shaft and the second surface is greater than a slant angle formed by the first surface and the radial direction.

3. The spindle motor according to claim 1, wherein the rise prevention unit includes a plurality of slits opened from a border between the first and second surfaces to a lower end of the second surface.

4. The spindle motor according to claim 3, wherein each of the slits is formed at an equidistant gap along the second surface.

5. The spindle motor according to claim 3, wherein the rise prevention unit includes a chamfer on which the inner periphery of the optical disk slides.

6. The spindle motor according to claim 1, wherein the rise prevention unit includes a plurality of protruders protruded from the border between the first and second surfaces to the lower end of the second surface.

7. The spindle motor according to claim 6, wherein each of the protruders is formed at an equidistant gap along the second surface.

8. The spindle motor according to claim 6, wherein the rise prevention unit includes a chamfer on which the inner periphery of the optical disk slides.

9. The spindle motor according to claim 1, wherein the center cone includes a third surface formed in a direction parallel with an axial direction of the rotation shaft along the margin of the distal end of the second surface.

10. The spindle motor according to claim 1, wherein the center cone includes a back yoke formed at a distal end of the body to move along the axial direction of the rotation shaft along with the body, and a closely-adhered magnet formed at the back yoke to prevent the center cone from rising toward a distal end of the rotation shaft.

11. The spindle motor according to claim 10, wherein the back yoke includes a plate coupled to the center cone and formed with the closely-adhered magnet, and a both ends-opened bush protruded from the plate to be coupled to the rotation shaft and coupled to a guide protruder protruded on a clamper, wherein an upper surface of the plate is arranged at a position higher than the distal end of the rotation shaft.

12. A spindle motor, comprising:
a rotation shaft rotated by a stator and a rotor;
a turn table integrally rotating with the rotation shaft and accommodated by an optical disk; a body movably coupled to the rotation shaft; and
a center cone including a first surface slantingly extended from a margin of a distal end of the body, a second surface slantingly extended along a margin of a distal end of the first surface to be provided with a friction preventing unit, and a slit formed at the turn table, and cut out along the second surface up to a distal end of the second surface to reduce an area contacting the optical disk, whereby an inner periphery of the optical disk is brought into contact to align a center of the optical disk to a same axial line as that of the rotation shaft, wherein a slant angle formed by an imaginary line perpendicular to the rotation shaft is relatively greater than a slant angle formed by an imaginary line perpendicular to the rotation shaft and the first surface, and the slit is formed at an equidistant gap along the second surface.

13. The spindle motor according to claim 12, wherein the center cone includes a back yoke formed at a distal end of the body to be movably coupled to the rotation shaft, and a closely-adhered magnet formed at the back yoke and attached to a clamper of an optical disk drive when the optical disk is rotated, thereby preventing the center cone from rising toward a distal end of the rotation shaft.

14. The spindle motor according to claim 13, wherein the back yoke includes a plate coupled to the center cone and formed with the closely-adhered magnet, and a both-ends opened bush protruded from the plate to be coupled to the rotation shaft and coupled to a guide protruder protruded on a clamper, wherein an upper surface of the plate is arranged at a position higher than the distal end of the rotation shaft.

15. The spindle motor according to claim 12, further comprising: a chamfer formed along a margin of the slit.

16. A spindle motor, comprising:
a rotation shaft rotated by a stator and a rotor;
a turn table integrally rotating with the rotation shaft and accommodated by an optical disk;
a body movably coupled to the rotation shaft; and
a center cone including a first surface slantingly extended from a margin of a distal end of the body, a second surface slantingly extended along a margin of a distal end of the first surface to be provided with a friction preventing unit, and a plurality of protruders formed at the turn table, and protruded up to a distal end of the second surface along the second surface to induce the optical disk to be accommodated on the turn table by reducing an area contacting the optical disk, whereby an inner periphery of the optical disk is brought into contact to align a center of the optical disk to a same axial line as that of the rotation shaft, wherein a slant angle formed by an imaginary line perpendicular to the rotation shaft is relatively greater than a slant angle formed by an imaginary line perpendicular to the rotation shaft and the first surface, and each of the protruders is formed at an equidistant gap along the second surface.

17. The spindle motor according to claim 16, wherein the center cone includes a back yoke formed at a distal end of the body to be movably coupled to the rotation shaft, and a closely-adhered magnet formed at the back yoke and attached to a damper of an optical disk drive when the optical disk is rotated, thereby preventing the center cone from rising toward a distal end of the rotation shaft.

18. The spindle motor according to claim 17, wherein the back yoke includes a plate coupled to the center cone and formed with the closely-adhered magnet, and a both-ends opened bush protruded from the plate to be coupled to the rotation shaft and coupled to a guide protruder protruded on a damper, wherein an upper surface of the plate is arranged at a position higher than the distal end of the rotation shaft.

19. The spindle motor according to claim 18, further comprising: a chamfer formed along a margin of the protruders.

* * * * *